United States Patent

Sasayama

(10) Patent No.: US 8,482,822 B2
(45) Date of Patent: Jul. 9, 2013

(54) IMAGE RECORDING APPARATUS, IMAGE PROCESSING APPARATUS, IMAGE PROCESSING METHOD AND COMPUTER-READABLE MEDIUM FOR SELECTING A SUBSIDIARY IMAGE PROCESSING DEVICE

(75) Inventor: Hiroyuki Sasayama, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 679 days.

(21) Appl. No.: 12/713,947

(22) Filed: Feb. 26, 2010

(65) Prior Publication Data
US 2010/0220365 A1    Sep. 2, 2010

(30) Foreign Application Priority Data

Feb. 27, 2009    (JP) ................................ 2009-046725

(51) Int. Cl.
*H04N 1/46* (2006.01)
(52) U.S. Cl.
USPC ............ 358/504; 358/1.9; 358/448; 358/518; 358/463; 347/19
(58) Field of Classification Search
None
See application file for complete search history.

(56) References Cited

U.S. PATENT DOCUMENTS

| 6,025,929 A | 2/2000 | Nakajima et al. |
| 2003/0086100 A1 | 5/2003 | Yashima et al. |
| 2004/0104951 A1 | 6/2004 | Shibata et al. |
| 2006/0214960 A1 * | 9/2006 | Chiwata .......................... 347/10 |
| 2006/0262151 A1 | 11/2006 | Chiwata |
| 2007/0132804 A1 * | 6/2007 | Chiwata .......................... 347/19 |
| 2009/0109458 A1 * | 4/2009 | Nagata ............................ 358/1.9 |

FOREIGN PATENT DOCUMENTS

| JP | 5-96796 A | 4/1993 |
| JP | 10-013674 | 1/1998 |
| JP | 2003-136764 A | 5/2003 |
| JP | 2004-058282 A | 2/2004 |
| JP | 2006-240000 A | 9/2006 |
| JP | 2006-347164 A | 12/2006 |
| JP | 2007-203721 A | 8/2007 |

OTHER PUBLICATIONS

JP Office Action (Notification of Reasons for Rejection) issued in counterpart JP Patent Application No. 2009-046725 on Feb. 15, 2013.
JP Office Action (Notification of Reasons for Rejection) issued in counterpart JP Application No. 2009-046725 on Apr. 26, 2013.

* cited by examiner

*Primary Examiner* — Dung Tran
(74) *Attorney, Agent, or Firm* — Birch, Stewart, Kolasch & Birch, LLP

(57) ABSTRACT

An image recording apparatus includes: a recording head which has a plurality of recording elements; a conveyance device which conveys at least one of the recording head and a recording medium to cause relative movement between the recording head and the recording medium; an input device which inputs image data; an image processing device which causes a plurality of subsidiary image processing devices to perform a plurality of subsidiary image processes with respect to the input image data so as to generate output data; an image recording device which causes the recording head to perform recording on the recording medium according to the generated output data; a selection device which selects, of the plurality of subsidiary image processing devices, a subsidiary image processing device that is not to reflect, in the output data, processing result; and a control device which controls the selection device in accordance with the input image data.

16 Claims, 15 Drawing Sheets

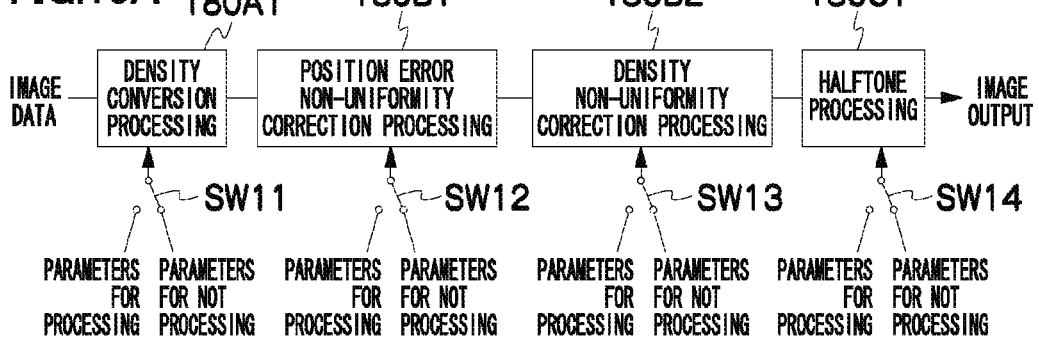
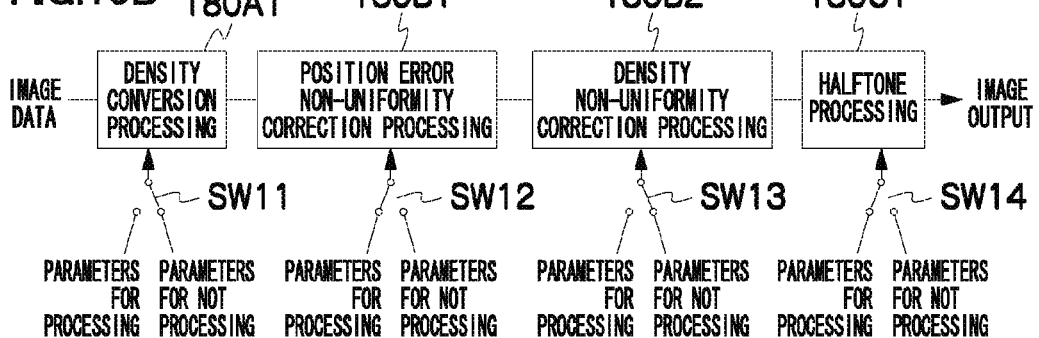
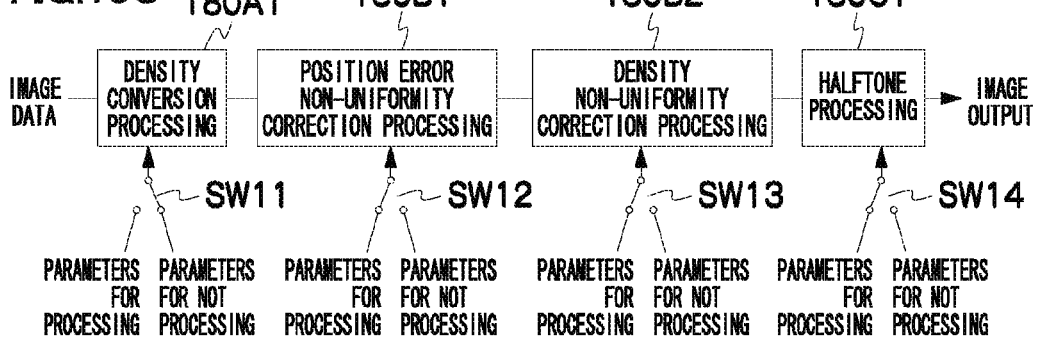
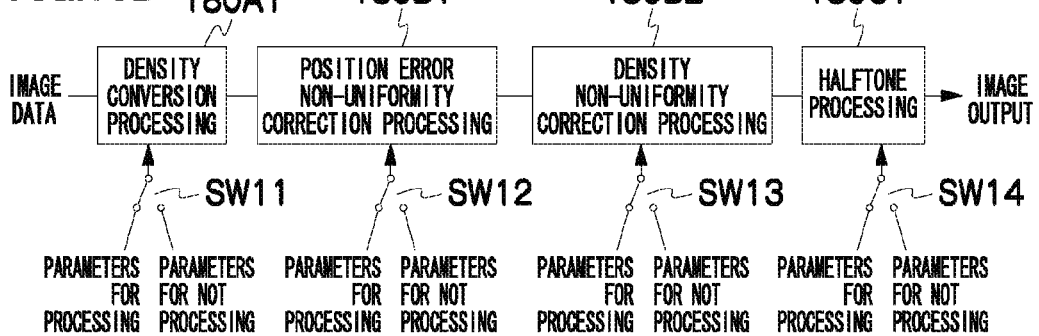

IMAGE RECORDING APPARATUS, IMAGE PROCESSING APPARATUS, IMAGE PROCESSING METHOD AND COMPUTER-READABLE MEDIUM FOR SELECTING A SUBSIDIARY IMAGE PROCESSING DEVICE

BACKGROUND OF THE INVENTION

1. Field of the Invention

The present invention relates to an image recording apparatus, an image processing apparatus, an image processing method and a computer-readable medium, and more particularly, to an image recording apparatus, an image processing apparatus, an image processing method and a computer-readable medium which carry out data processing by conjointly using a plurality of image processes, in respect of image data for performing recording on a recording medium (recording paper) using a recording head having a plurality of recording elements.

2. Description of the Related Art

Japanese Patent Application Publication No. 2003-136764 discloses an image correction method for an inkjet recording apparatus which records an image by ejecting ink onto a recording medium using a recording head in which a plurality of nozzles for ejecting ink are arranged, wherein an ejection failure determination pattern for investigating the ejection status of the recording head is recorded and measured, and on the basis of this, ejection failure nozzles are identified, in addition to which a shading pattern is recorded and measured to determine the density distribution corresponding to the respective nozzles, and an amount of compensation for performing compensation with different colors is determined on the basis of the determined density distribution or the result of carrying out suitable calculations in respect of the density distribution.

According to the image correction method in Japanese Patent Application Publication No. 2003-136764, it is possible to carry out ejection failure correction in accordance with the state of droplet ejection, such as the positional deviation of adjacent nozzles, droplet volume non-uniformities, and the like, by using density data for the periphery of an ejection failure nozzle.

Japanese Patent Application Publication No. 2003-136764 does not disclose in particular the changing of the image processing steps when outputting an ejection failure nozzle determination pattern or a shading pattern, or when subsequently outputting an image corrected for non-uniformities. However, in cases where a plurality of non-uniformity corrections are used conjointly, for instance, a case which combines ejection failure correction and shading correction, or a case which also combines other non-uniformity correction, such as non-uniformity correction in respect of droplet ejection position error, there is a possibility that problems occur, in which, for example, image processing steps for outputting a normal image are identified wrongly as image processing steps for outputting a test pattern.

For example, in a case where the image processing steps in the case of normal image output include an ejection failure correction step and a shading correction step, the shading correction step is not used when outputting a test pattern for shading measurement. This is because it is not possible to measure shading accurately from a test pattern for shading measurement which has been output by applying shading correction.

SUMMARY OF THE INVENTION

The present invention has been contrived in view of these circumstances, an object thereof being to provide an image recording apparatus, an image processing apparatus, an image processing method and a computer-readable medium whereby suitable image processing can be carried out in accordance with the type of image data, even in cases where a plurality of image processes are used conjointly.

In order to attain an object described above, one aspect of the present invention is directed to an image recording apparatus, comprising: a recording head which has a plurality of recording elements; a conveyance device which conveys at least one of the recording head and a recording medium to cause relative movement between the recording head and the recording medium; an input device which inputs image data; an image processing device which causes a plurality of subsidiary image processing devices to perform a plurality of subsidiary image processes with respect to the input image data so as to generate output data; an image recording device which causes the recording head to perform recording on the recording medium according to the generated output data; a selection device which selects, of the plurality of subsidiary image processing devices, a subsidiary image processing device that is not to reflect, in the output data, processing result; and a control device which controls the selection device in accordance with the input image data.

According to this aspect of the invention, the selection device which selects a subsidiary image processing device that is not to reflect the processing results in the output data, of the plurality of subsidiary image processing devices, and the selection device is controlled in accordance with the input image data. Therefore, it is possible to carry out suitable image processing in accordance with the input image data.

Desirably, the image processing device causes the subsidiary image processing device selected by the selection device, not to perform the subsidiary image process.

According to this aspect of the invention, it is possible to prevent the processing result of the selected subsidiary image processing device from being reflected in the output data, by means of a simple structure.

Desirably, the image processing device causes the subsidiary image processing device selected by the selection device to perform the subsidiary image process using a parameter by which the processing result is not reflected in the output data.

According to this aspect of the invention, it is possible to prevent the processing results of the selected subsidiary image processing device from being reflected in the output data, by means of a simple structure.

Desirably, the plurality of subsidiary image processing devices include a non-uniformity correction processing device which carries out correction processing of the image data according to information on various types of non-uniformity relating to the plurality of recording elements.

According to this aspect of the invention, it is possible to select whether or not to reflect processing results in the output data by means of the selection device, in respect of a non-uniformity correction processing device. Consequently, if the input image data is test chart data for calculating correction values for the non-uniformity correction processing device, then it is possible to output a suitable test chart, and as a result of this, correction values for the non-uniformity correction processing device can be calculated appropriately.

Desirably, the non-uniformity correction processing device includes at least one of: a recording defect non-uniformity correction processing device which corrects a recording element having a recording defect, of the plurality of recording elements; a position error non-uniformity correction processing device which corrects recording position error of the plurality of recording elements; and a density non-uniformity correction processing device which corrects recording density of the plurality of recording elements.

Desirably, the non-uniformity correction processing device includes the recording defect non-uniformity correction processing device; and when the input image data is a test chart for recording-defect determination for determining the recording element having the recording defect, of the plurality of recording elements, the selection device selects the recording defect non-uniformity correction processing device.

According to this aspect of the invention, it is possible to output a suitable test chart for recording defect determination.

Desirably, the image recording apparatus further comprises a determination device which determines the recording element having the recording defect, of the plurality of recording elements, according to the test chart for recording-defect determination recorded by the image recording device, wherein the recording defect non-uniformity correction processing device carries out correction processing of the image data according to information on the determined recording element having the recording defect.

According to this aspect of the invention, it is possible suitably to correct a recording element having a recording defect.

Desirably, the non-uniformity correction processing device includes the position error non-uniformity correction processing device; and when the input image data is a test chart for recording position error measurement for measuring recording position error of the plurality of recording elements, the selection device selects the position error non-uniformity correction processing device.

According to this aspect of the invention, it is possible to output a suitable test chart for recording position error measurement.

Desirably, the image recording apparatus further comprises a measurement device which determines the recording position error of the plurality of recording elements, according to the test chart for recording position error measurement recorded by the image recording device, wherein the position error non-uniformity correction processing device carries out correction processing of the image data according to information on the determined recording position error.

According to this aspect of the invention, it is possible suitably to correct recording position error in the plurality of recording elements.

Desirably, the non-uniformity correction processing device includes the density non-uniformity correction processing device; and when the input image data is a test chart for density non-uniformity measurement for measuring the recording density of the plurality of recording elements, the selection device selects the density non-uniformity correction processing device.

According to this aspect of the invention, it is possible to output a suitable test chart for density non-uniformity measurement.

Desirably, the image recording apparatus further comprises a density measurement device which determines the recording density of the plurality of recording elements, according to the test chart for density non-uniformity measurement recorded by the image recording device, wherein the density non-uniformity correction processing device carries out correction processing of the image data according to information on the determined recording density.

According to this aspect of the invention, it is possible suitably to correct the recording density of the plurality of recording elements.

Desirably, the plurality of recording elements are ink ejection nozzles.

According to this aspect of the invention, application to an inkjet recording apparatus having ink ejection nozzles becomes possible.

In order to attain an object described above, another aspect of the present invention is directed to an image processing device comprising: an input device which inputs image data for performing recording onto a recording medium while at least one of a recording head having a plurality of recording elements and the recording medium is conveyed; an image processing device which causes a plurality of subsidiary image processing devices to perform a plurality of subsidiary image processes with respect to the input image data so as to generate output data; an output device which outputs the generated output data; a selection device which selects, of the plurality of subsidiary image processing devices, a subsidiary image processing device that is not to reflect, in the output data, processing result; and a control device which controls the selection device in accordance with the input image data.

In order to attain an object described above, another aspect of the present invention is directed to an image processing method comprising: an input step of inputting image data for performing recording onto a recording medium while conveying at least one of a recording head having a plurality of recording elements and the recording medium; an image processing step of performing a plurality of subsidiary image processes with respect to the input image data so as to generate output data; an output step of outputting the generated output data; a selection step of selecting, of the plurality of subsidiary image processes, a subsidiary image processes that is not to reflect, in the output data, processing result; and a control step of controlling the selection step in accordance with the input image data.

In order to attain an object described above, one aspect of the present invention is directed to a computer-readable medium storing instructions to cause a computer to execute at least an image processing method comprising: an input step of inputting image data for performing recording onto a recording medium while conveying at least one of a recording head having a plurality of recording elements and the recording medium; an image processing step of performing a plurality of subsidiary image processes with respect to the input image data so as to generate output data; an output step of outputting the generated output data; a selection step of selecting, of the plurality of subsidiary image processes, a subsidiary image processes that is not to reflect, in the output data, processing result; and a control step of controlling the selection step in accordance with the input image data.

A program which causes a computer to implement an image processing method according to an aspect of the present invention is also included in the present invention.

According to the present invention, since a selection device which selects a subsidiary image processing device that is not to reflect the processing results in the output data, of the plurality of subsidiary image processing devices, and the selection device is controlled in accordance with input image data, then it is possible to carry out suitable image processing in accordance with the input image data.

BRIEF DESCRIPTION OF THE DRAWINGS

FIGS. 15A to 15D are diagrams illustrating processing parameters in the respective processing units, for respective input data.

DESCRIPTION OF THE PREFERRED EMBODIMENTS

Composition of Inkjet Recording Apparatus

Figure 1:
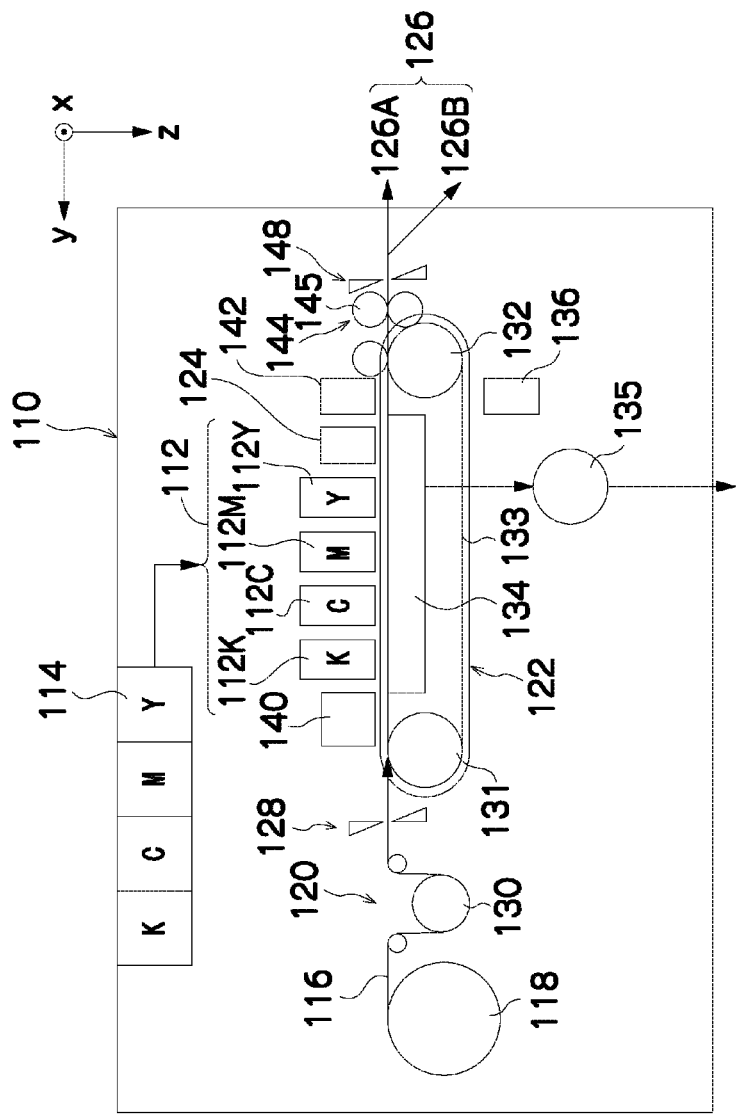
FIG. 1 is a general schematic drawing of an inkjet recording apparatus employing an image processing apparatus relating to one embodiment of the present invention.

FIG. 1 is a general configuration diagram of an image forming device according to one embodiment of the present invention. As illustrated in FIG. 1, the inkjet recording apparatus 110 according to the present embodiment comprises: a recording head (printing unit) 112 having a plurality of inkjet recording heads (hereafter, also simply called "heads") 112K, 112C, 112M, and 112Y provided for the respective ink colors (i.e. black, cyan, magenta and yellow); an ink storing and loading unit 114 for storing inks of K, C, M and Y to be supplied to the printing heads 112K, 112C, 112M, and 112Y; a paper supply unit 118 for supplying recording paper (recording medium) 116; a decurling unit 120 removing curl in the recording paper 116; a belt conveyance unit 122 disposed facing the nozzle face (ink-droplet ejection face) of the recording head 112, for conveying the recording paper 116 while keeping the recording paper 116 flat; a print determination unit 124 for reading the recorded result produced by the recording head 112; and a paper output unit 126 for outputting image-printed paper (printed matter) to the exterior.

The ink storing and loading unit 114 comprises ink tanks for storing inks of colors corresponding to the heads 112K, 112C, 112M and 112Y, and each tank is connected to a head 112K, 112C, 112M and 112Y via a prescribed channel. The ink storing and loading unit 114 also comprises a warning device (for example, a display device or an alarm sound generator) for warning when the remaining amount of any ink is low, and has a mechanism for preventing loading errors between different colors.

In FIG. 1, a magazine for rolled paper (continuous paper) is illustrated as an example of the paper supply unit 118; however, more magazines with paper differences such as paper width and quality may be jointly provided. Moreover, papers may be supplied with cassettes that contain cut papers loaded in layers and that are used jointly or in lieu of the magazine for rolled paper.

In the case of a configuration in which a plurality of types of recording media can be used, it is desirable that an information recording medium such as a bar code and a wireless tag containing information on the type of medium is attached to the magazine, and by reading the information contained in the information recording medium with a predetermined reading device, the type of medium to be used is automatically determined, and ink-droplet ejection is controlled so that the ink-droplets are ejected in an appropriate manner in accordance with the type of medium.

The recording paper 116 delivered from the paper supply unit 118 retains curl due to having been loaded in the magazine. In order to remove the curl, heat is applied to the recording paper 116 in the decurling unit 120 by a heating drum 130 in the direction opposite from the curl direction in the magazine. The heating temperature at this time is desirably controlled so that the recording paper 116 has a curl in which the surface on which the print is to be made is slightly round outward.

In the case of a configuration in which roll paper is used, a cutter (first cutter) 128 is provided and the roll paper is cut to a desired size by the cutter 128. When cut paper is used, the cutter 128 is not required.

The decurled and cut recording paper 116 is delivered to the suction belt conveyance unit 122. The suction belt conveyance unit 122 has a configuration in which an endless belt 133 is set around rollers 131 and 132 so that the portion of the endless belt 133 facing at least the nozzle face of the recording head 112 and the sensor face of the print determination unit 124 forms a plane (flat face).

The belt 133 has a width that is greater than the width of the recording paper 116, and a plurality of suction apertures (not illustrated) are formed on the belt surface. A suction chamber 134 is disposed in a position facing the sensor surface of the print determination unit 124 and the nozzle surface of the recording head 112 on the interior side of the belt 133, which is set around the rollers 131 and 132, as illustrated in FIG. 1. The suction chamber 134 provides suction with a fan 135 to generate a negative pressure, and the recording paper 116 on the belt 133 is held by suction. Instead of this suction system, an electrostatic adsorption system may be used The belt 133 is driven in the clockwise direction in FIG. 1 by the motive force of a motor (reference numeral 188 in FIG. 6) being transmitted to at least one of the rollers 131 and 132, which the belt 133 is set around, and the recording paper 116 held on the belt 133 is conveyed from left to right in FIG. 1.

Since ink adheres to the belt 133 when a marginless print job or the like is performed, a belt-cleaning unit 136 is disposed in a predetermined position (a suitable position outside the printing area) on the exterior side of the belt 133. Although the details of the configuration of the belt-cleaning unit 136 are not illustrated, examples thereof include a configuration in which the belt 133 is nipped with cleaning rollers such as a brush roller and a water absorbent roller, an air blow configuration in which clean air is blown onto the belt 133, and a combination of these. In the case of the configuration in which the belt 133 is nipped with the cleaning rollers, it is desirable to make the line velocity of the cleaning rollers different from that of the belt 133 to improve the cleaning effect.

A roller nip conveyance mechanism, in place of the belt conveyance unit 122, can be employed. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is desirable.

A heating fan 140 is disposed on the upstream side of the recording head 112 in the conveyance pathway formed by the belt conveyance unit 122. The heating fan 140 blows heated air onto the recording paper 116 to heat the recording paper 116 immediately before printing so that the ink deposited on the recording paper 116 dries more easily.

Figure 2:
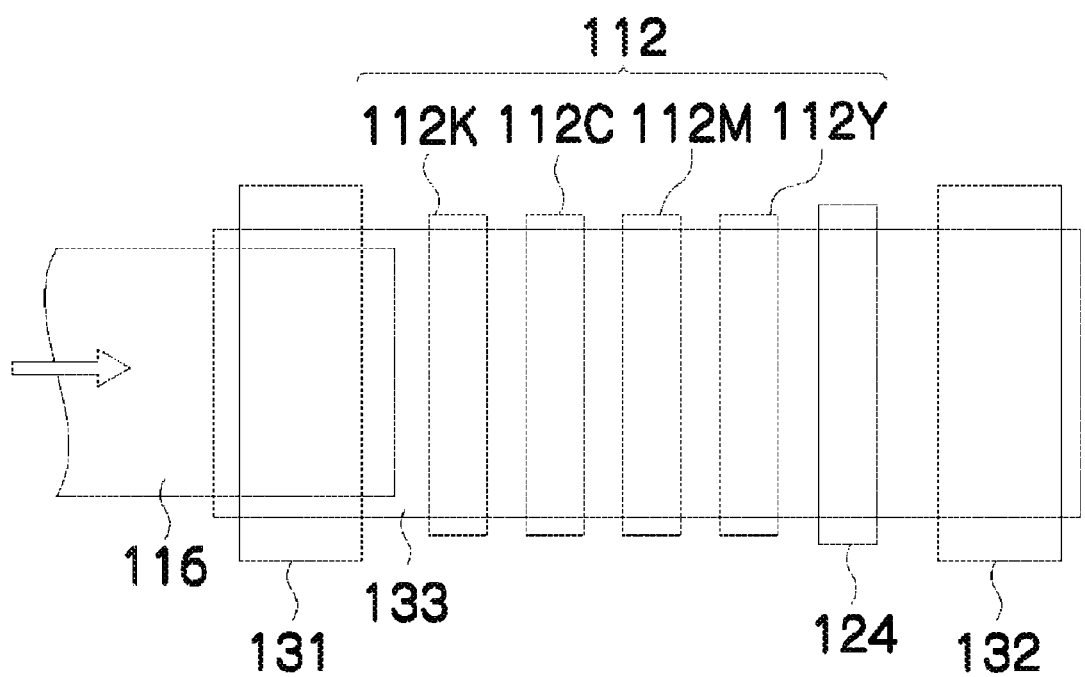
FIG. 2 is a plan view of a principal part of the peripheral area of a recording head in the inkjet recording apparatus illustrated in FIG. 1.

The recording head 112 is a so-called "full line head" in which a line head having a length corresponding to the maximum paper width of the recording paper 116 is fixed extending in a direction (main scanning direction) that is perpendicular to the paper conveyance direction (sub scanning direction). Each of the printing heads 112K, 112C, 112M, and 112Y constituting the recording head 112 is constituted by a line head, in which a plurality of ink ejection ports (nozzles) are arranged along a length (entire width of the printable area) that exceeds at least one side of the maximum-size recording paper 116 intended for use in the inkjet recording apparatus 110 (see FIG. 2).

The printing heads 112K, 112C, 112M, and 112Y are arranged in the color order of black (K), cyan (C), magenta (M), and yellow (Y) from the upstream side, along the feed direction of the recording paper 116, and are fixed so as to extend in the direction which is substantially perpendicular to the conveyance direction of the recording paper 116.

A color image can be formed on the recording paper 116 by ejecting the different color inks from the printing heads 112K, 112C, 112M, and 112Y, respectively, onto the recording paper 116 while conveying the recording paper 116 by the belt conveyance unit 122.

By adopting the recording head 112 in which the full line type heads 112K, 112C, 112M, and 112Y having nozzle rows covering the full paper width are provided for the respective ink colors in this way, it is possible to record an image on the full surface of the recording paper 116 by performing just one operation of relatively moving the recording paper 116 and the recording head 112 in the paper conveyance direction (the sub-scanning direction), in other words, by means of a single sub-scanning action. Higher-speed printing is thereby made possible and productivity can be improved in comparison with a shuttle type head configuration in which a recording head reciprocates in a direction (the main scanning direction) orthogonal to the paper conveyance direction.

Although the configuration with the KCMY four standard colors is described in the present embodiment, combinations of the ink colors and the number of colors are not limited to those. Light inks, dark inks or special inks can be added as required. For example, a configuration is possible in which inkjet heads for ejecting light-colored inks such as light cyan and light magenta are added. Furthermore, there are no particular restrictions of the sequence in which the heads of respective colors are arranged.

The print determination unit 124 illustrated in FIG. 1 has an image sensor (line sensor or area sensor) for capturing an image of the ink-droplet deposition result of the recording head 112, and functions as a device to check for ejection properties such as clogs of the nozzles in the recording head 112 and the ink-droplet position errors from the ink-droplet deposition results evaluated by the image sensor. The print determination unit 124 reads a test chart image or practical image printed by the heads 112K, 112C, 112M, and 112Y for the respective colors, and the ejection of each head is determined. The ejection determination includes measurement of the presence of the ejection, measurement of the dot size, and measurement of the dot droplet position.

A post-drying unit 142 is disposed following the print determination unit 124. The post-drying unit 142 is a device to dry the printed image surface, and includes a heating fan, for example. It is desirable to avoid contact with the printed surface until the printed ink dries, and a device that blows heated air onto the printed surface is desirable.

In cases in which printing is performed with dye-based ink on porous paper, blocking the pores of the paper by the application of pressure prevents the ink from coming contact with ozone and other substances that cause dye molecules to break down, and has the effect of increasing the durability of the print.

A heating/pressurizing unit 144 is disposed following the post-drying unit 142. The heating/pressurizing unit 144 is a device to control the glossiness of the image surface, and the image surface is pressed with a pressure roller 145 having a predetermined uneven surface shape while the image surface is heated, and the uneven shape is transferred to the image surface.

The printed matter generated in this manner is outputted from the paper output unit 126. The target print (i.e., the result of printing the target image) and the test print are desirably outputted separately. In the inkjet recording apparatus 110, a sorting device (not illustrated) is provided for switching the outputting pathways in order to sort the printed matter with the target print and the printed matter with the test print, and to send them to paper output units 126A and 126B, respectively. When the target print and the test print are simultaneously formed in parallel on the same large sheet of paper, the test print portion is cut and separated by a cutter (second cutter) 148. Although not illustrated in FIG. 1, the paper output unit 126A for the target prints is provided with a sorter for collecting prints according to print orders.

Structure of the Head

Next, the structure of heads 112K, 112C, 112M and 112Y will be described. The heads 112K, 112C, 112M and 112Y of the respective ink colors have the same structure, and a reference numeral 150 is hereinafter designated to any of the heads.

Figure 3A:
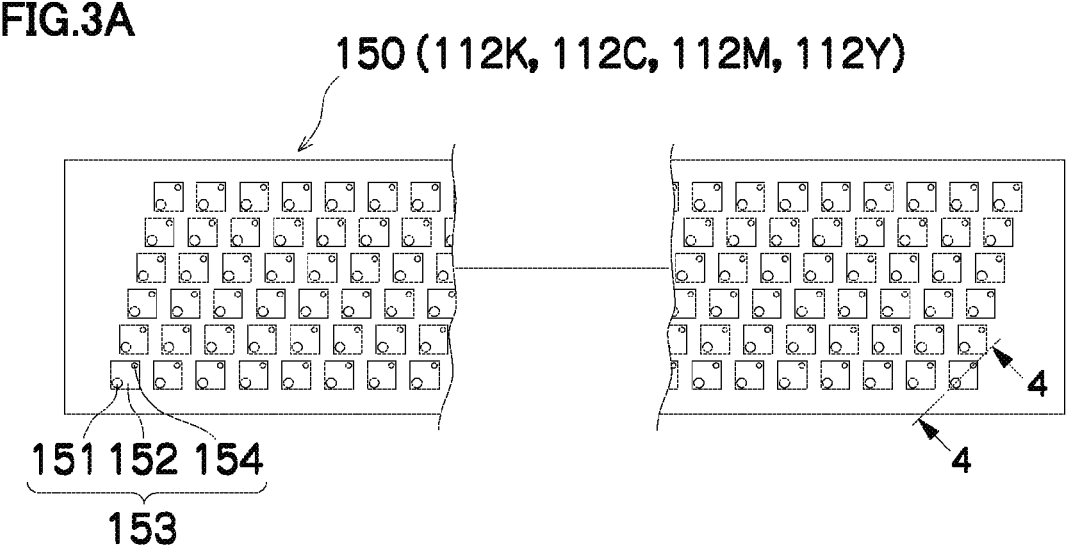
FIGS. 3A to 3C are plan view perspective diagrams illustrating examples of the composition of a printing head.
Figure 3B:
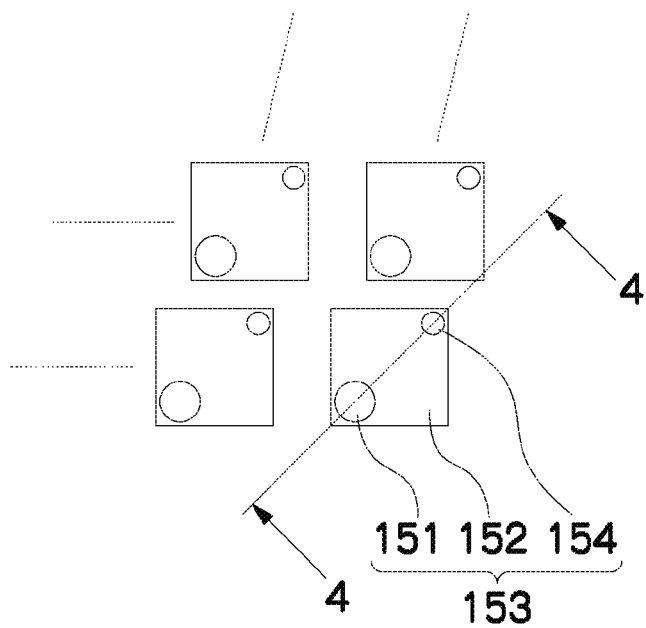
Figure 3C:
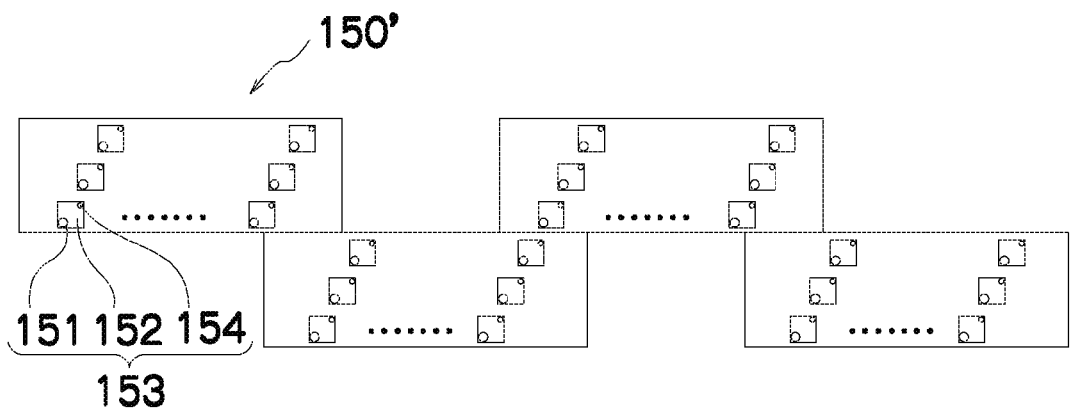
Figure 4:
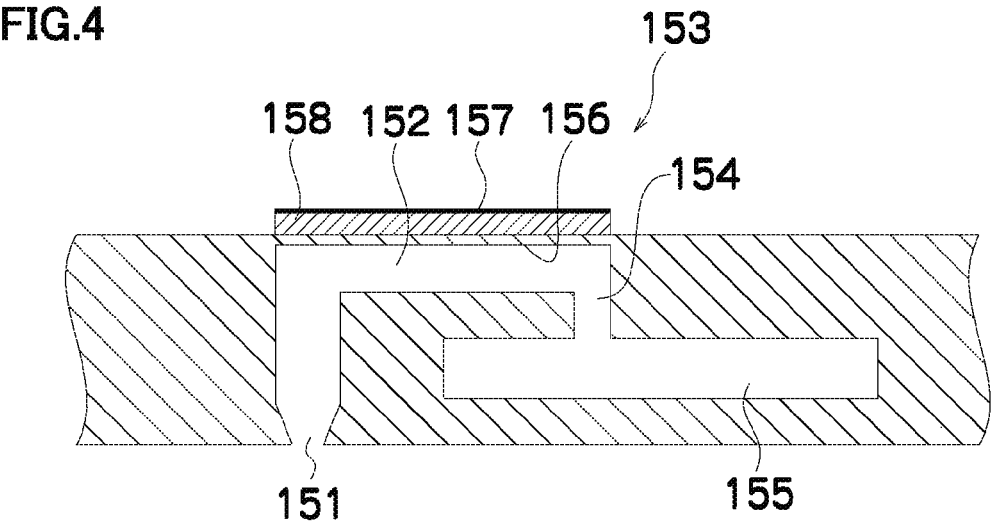
FIG. 4 is a cross-sectional diagram along line 4-4 in FIGS. 3A and 3B.

FIG. 3A is a plan perspective diagram illustrating an example of the structure of a head 150, and FIG. 3B is a partial enlarged diagram of FIG. 3A. Moreover, FIG. 3C is a plan view perspective diagram illustrating a further example of the structure of the head 150. FIG. 4 is a cross-sectional diagram (a cross-sectional diagram along line 4-4 in FIG. 3A) illustrating the composition of one liquid ejection element (an ink chamber unit corresponding to one nozzle 151).

The nozzle pitch in the head 150 should be minimized in order to maximize the density of the dots formed on the surface of the recording paper 116. As illustrated in FIGS. 3A and 3B, the head 150 according to the present embodiment has a structure in which a plurality of ink chamber units (liquid ejection elements) 153, each comprising a nozzle 151 forming an ink droplet ejection hole, a pressure chamber 152 corresponding to the nozzle 151, and the like, are disposed two-dimensionally in the form of a staggered matrix, and hence the effective nozzle interval (the projected nozzle pitch) as projected in the lengthwise direction of the head (the direction perpendicular to the paper conveyance direction) is reduced and high nozzle density is achieved.

The mode of forming one or more nozzle rows through a length corresponding to the entire width of the recording paper 116 in a direction substantially perpendicular to the paper conveyance direction is not limited to the example described above. For example, instead of the configuration in FIG. 3A, as illustrated in FIG. 3C, a line head having nozzle rows of a length corresponding to the entire width of the recording paper 116 can be formed by arranging and combining, in a staggered matrix, short head modules 150' having a plurality of nozzles 151 arrayed in a two-dimensional fashion.

As illustrated in FIGS. 3A and 3B, the planar shape of the pressure chamber 152 provided corresponding to each nozzle 151 is substantially a square shape, and an outlet port to the nozzle 151 is provided at one of the ends of a diagonal line of the planar shape, while an inlet port (supply port) 154 for supplying ink is provided at the other end thereof. The shape of the pressure chamber 152 is not limited to that of the present example and various modes are possible in which the planar shape is a quadrilateral shape (diamond shape, rectangular shape, or the like), a pentagonal shape, a hexagonal shape, or other polygonal shape, or a circular shape, elliptical shape, or the like.

As illustrated in FIG. 4, each pressure chamber 152 is connected to a common flow channel 155 via the supply port 154. The common flow channel 155 is connected to an ink tank (not illustrated), which is a base tank that supplies ink, and the ink supplied from the ink tank is delivered through the common flow channel 155 to the pressure chambers 152.

An actuator 158 provided with an individual electrode 157 is bonded to a pressure plate (a diaphragm that also serves as a common electrode) 156 which forms the surface of one portion (in FIG. 4, the ceiling) of the pressure chambers 152. When a drive voltage is applied to the individual electrode 157 and the common electrode, the actuator 158 deforms, thereby changing the volume of the pressure chamber 152. This causes a pressure change which results in ink being ejected from the nozzle 151. For the actuator 158, it is possible to adopt a piezoelectric element using a piezoelectric body, such as lead zirconate titanate, barium titanate, or the like. When the displacement of the actuator 158 returns to its original position after ejecting ink, the pressure chamber 152 is replenished with new ink from the common flow channel 155, via the supply port 154.

Figure 5:
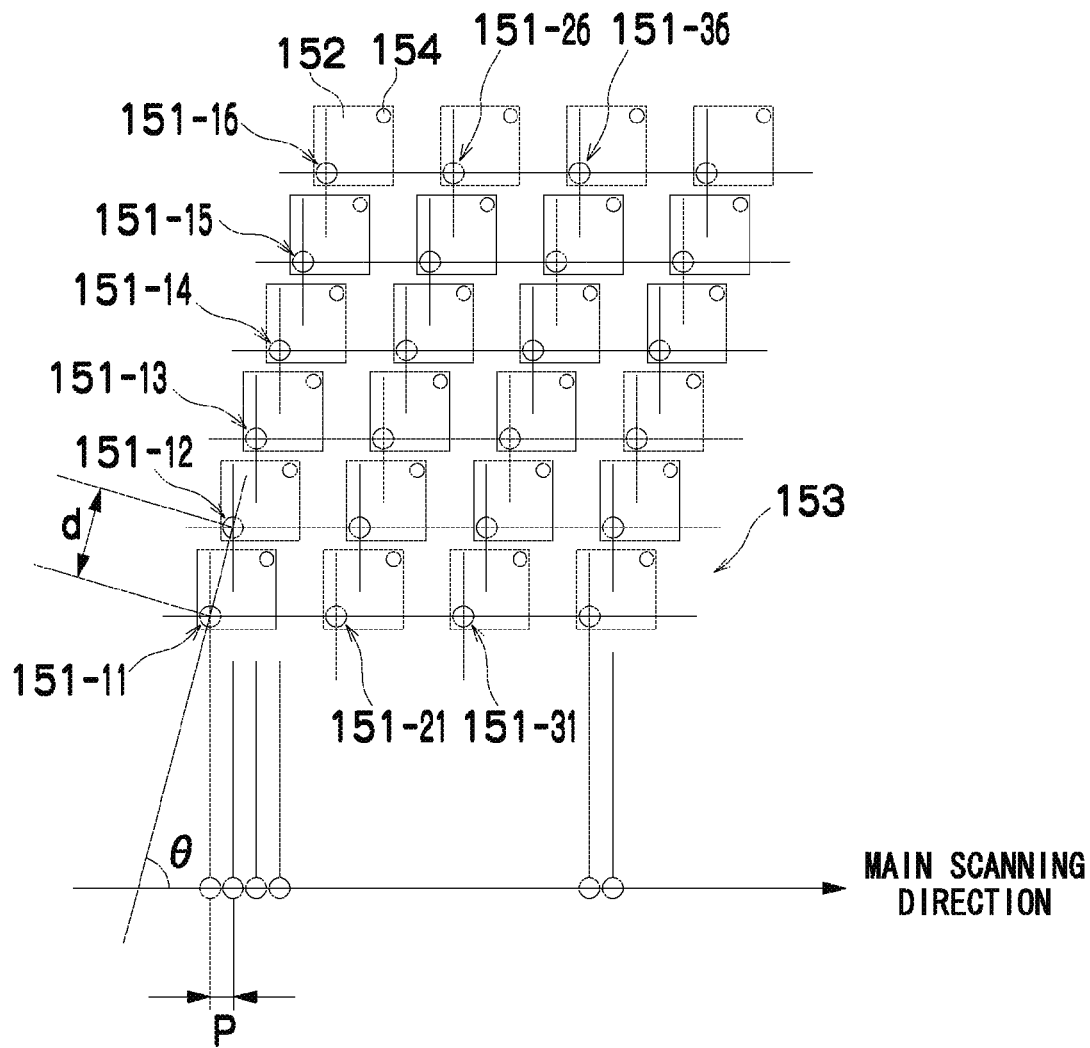
FIG. 5 is an enlarged view illustrating a nozzle arrangement in the printing head illustrated in FIGS. 3A to 3C.

As illustrated in FIG. 5, the high-density nozzle head according to the present embodiment is achieved by arranging a plurality of ink chamber units 153 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting a structure in which a plurality of ink chamber units 153 are arranged at a uniform pitch d in line with a direction forming an angle of θ with respect to the main scanning direction, the pitch P of the nozzles projected so as to align in the main scanning direction is d×cos θ, and hence the nozzles 151 can be regarded to be equivalent to those arranged linearly at a fixed pitch P along the main scanning direction. Such configuration results in a nozzle structure in which the nozzle row projected in the main scanning direction has a high nozzle density of up to 2,400 nozzles per inch in one nozzle row.

More specifically, in a full-line head comprising rows of nozzles of a length corresponding to the entire width of the printable area, "main scanning" is defined as printing one line (a line formed of a row of dots, or a line formed of a plurality of rows of dots) in the breadthways direction of the paper (the direction perpendicular to the conveyance direction of the paper) by driving the nozzles in one of the following ways: (1) simultaneously driving all the nozzles; (2) sequentially driving the nozzles from one side toward the other; and (3) dividing the nozzles into blocks and sequentially driving the blocks of the nozzles from one side toward the other.

In particular, when the nozzles 151 arranged in a matrix such as that illustrated in FIG. 5 are driven, it is desirable that main scanning is performed in accordance with (3) described above. In other words, one line is printed in the breadthways direction of the recording paper 116 by taking the nozzles 151-11, 151-12, 151-13, 151-14, 151-15, 151-16 as one block (and taking the nozzles 151-21, . . . , 151-26, as one block, the nozzles 151-31, . . . , 151-36 as one block, and so on) and sequentially driving the nozzles 151-11, 151-12, . . . , 151-16 in accordance with the conveyance speed of the recording paper 116.

On the other hand, "sub-scanning" is defined as the action of repeatedly perform printing of one line (a line formed of a row of dots, or a line formed of a plurality of rows of dots) formed by the main scanning action, while moving the full-line head and the paper relative to each other.

The direction indicated by one line (or the lengthwise direction of a band-shaped region) recorded by main scanning as described above is called the "main scanning direction", and the direction in which sub-scanning is performed, is called the "sub-scanning direction". In other words, in the present embodiment, the conveyance direction of the recording paper 116 is called the sub-scanning direction and the direction perpendicular to same is called the main scanning direction.

In implementing the present invention, the arrangement of the nozzles is not limited to that of the example illustrated. Moreover, in the present embodiment, a method is employed wherein an ink droplet is ejected by means of the deformation of an actuator 158, which is, typically, a piezoelectric element, but in implementing the present invention, there are no particular restrictions on the method used for ejecting ink, and instead of a piezo jet method, it is also possible to apply various other types of methods, such as a thermal jet method, wherein the ink is heated and bubbles are caused to form therein, by means of a heat generating body, such as a heater, ink droplets being ejected by means of the pressure of these bubbles.

Configuration of Control System

Figure 6:
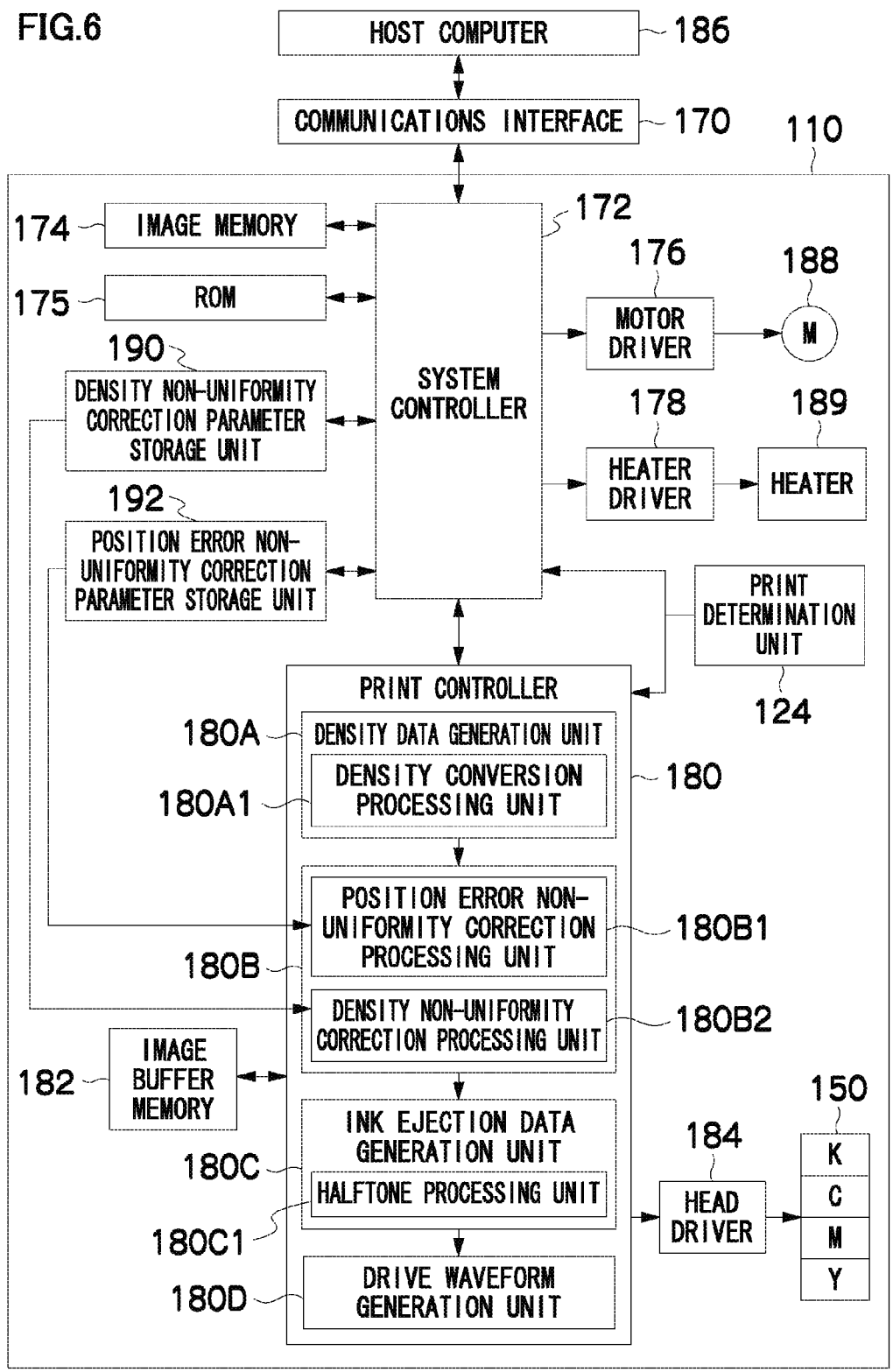
FIG. 6 is a principal block diagram illustrating a system composition of the inkjet recording apparatus.

FIG. 6 is a block diagram illustrating the control system of the inkjet recording device 110. As illustrated in FIG. 6, the inkjet recording device 110 comprises a communications interface 170, a system controller 172, an image memory 174, a ROM 175, a motor driver 176, a heater driver 178, a print controller 180, an image buffer memory 182, a head driver 184, and the like.

The communications interface 170 is an interface unit (image input device) for receiving image data sent from a host computer 186. A serial interface such as USB (Universal Serial Bus), IEEE1394, Ethernet (registered trademark), wireless network, or a parallel interface such as a Centronics interface may be used as the communications interface 170. A buffer memory (not illustrated) may be mounted in this portion in order to increase the communication speed.

The image data sent from the host computer 186 is received by the inkjet recording device 110 through the communications interface 170, and is temporarily stored in the image memory 174. The image memory 174 is a storage device for storing images inputted through the communications interface 170, and data is written and read to and from the memory 174 through the system controller 172. The image memory 174 is not limited to a memory composed of semiconductor elements, and a hard disk drive or another magnetic medium may be used.

The system controller 172 is constituted by a central processing unit (CPU) and peripheral circuits thereof, and the like, and functions as a control device which controls the whole of the inkjet recording device 110 in accordance with a prescribed program, as well as functioning as a calculation device which carries out various calculations. In other words, the system controller 172 controls the various units, such as the communications interface 170, the image memory 174, the motor driver 176, the heater driver 178, and the like, and controls communications with the host computer 186 as well as controlling the reading and writing of data to the image memory 174 and the ROM 175, and furthermore, it also generates control signals for controlling the motor 188 of the conveyance system and the heater 189.

The ROM 175 stores a program which is executed by the CPU of the system controller 172 and various data required for control purposes (including data relating to a test chart for position error measurement and a test chart for density measurement), and the like. The ROM 175 may be a non-rewriteable storage device, or a rewriteable storage device, such as an EEPROM.

The image memory 174 is used as a temporary storage region for the image data, and it is also used as a program development region and a calculation work region for the CPU.

Furthermore, the inkjet recording apparatus 110 comprises a density non-uniformity correction parameter storage unit 190 and a position error non-uniformity correction parameter storage unit 192.

The system controller 172 measures the position error data which indicates the droplet ejection position error for each nozzle 115 of the head 150, from the read data of the test chart for position error measurement read in by the print determination unit 124. Position error non-uniformity correction parameters are calculated from this position error data and are stored in the position error non-uniformity correction parameter storage unit 192.

Moreover, the system controller 172 measures the image density data of each nozzle 115 of the head 150 from the read data of the test chart for density measurement read in by the print determination unit 124. The density non-uniformity correction parameters for the respective nozzles 115 are calculated from the image density data and are stored in the density non-uniformity correction parameter storage unit 190.

It is also possible to adopt a composition in which the ROM 175 also serves as a density non-uniformity correction parameter storage unit 190 and a position error non-uniformity correction parameter storage unit 192, by utilizing the storage area of the ROM 175.

The motor driver (drive circuit) 176 drives the motors 188 of the conveyance system in accordance with commands from the system controller 172. The heater driver 178 drives the heaters 189 of the post-drying unit 142 and the like in accordance with commands from the system controller 172.

The print controller 180 is a control unit which functions as a signal processing device for performing various treatment processes, corrections, and the like, in accordance with the control implemented by the system controller 172, in order to generate a signal for controlling droplet ejection from the image data (multiple-value input image data) in the image memory 174, as well as functioning as a drive control device which controls the ejection driving of the head 150 by supplying the ink ejection data thus generated to the head driver 184.

In other words, the print controller 180 comprises a density data generation unit 180A, a correction processing unit 180B, an ink ejection data generation unit 180C and a drive waveform generation unit 180D. These functional blocks (180A to 180D) can be realized by means of an ASIC, software or a suitable combination of same.

The density data generation unit 180A is a processing device which carries out density conversion processing and, if necessary, pixel number conversion processing, and is configured including a density conversion processing unit 180A1. The density conversion processing unit 180A1 is a processing device which generates initial density data by converting an input RGB luminosity signal to a CMYK density signal.

The correction processing unit 180B is a processing device which carries out non-uniformity correction processing of image data input from the density data generation unit 180A, and is constituted by a position error non-uniformity correction processing unit 180B1 and a density non-uniformity correction processing unit 180B2. The position error correction processing unit 180B1 is a processing device which carries out calculations for correcting droplet ejection position error on the basis of position error correction parameters stored in a position error non-uniformity correction parameter storage unit 192. Furthermore, the density non-uniformity correction processing unit 180B2 is a processing device which carries out calculations for correcting density, on the basis of density non-uniformity correction parameters stored in the density non-uniformity correction parameter storage unit 190.

The ink ejection data generation unit 180C is a signal processing device including a halftone processing unit 180C1. The halftone processing unit 180C1 carries out binary (multiple-value) conversion processing for converting the corrected density data generated by the correction processing unit 180B into binary (or multiple-value) dot data. The ink ejection data generated by the ink ejection data generation unit 180C is supplied to the head driver 184, which controls the ink ejection operation of the head 150 accordingly.

The drive waveform generation unit 180D is a device for generating drive signal waveforms in order to drive the actuators 158 (see FIG. 4) corresponding to the respective nozzles 151 of the head 150. The signal (drive waveform) generated by the drive waveform generation unit 180D is supplied to the head driver 184. The signal output from the drive waveform generation unit 180D may be digital waveform data, or it may be an analog voltage signal.

The image buffer memory 182 is provided in the print controller 180, and image data, parameters, and other data are temporarily stored in the image buffer memory 182 when image data is processed in the print controller 180. FIG. 6 illustrates a mode in which the image buffer memory 182 is attached to the print controller 180; however, the image memory 174 may also serve as the image buffer memory 182. Also possible is a mode in which the print controller 180 and the system controller 172 are integrated to form a single processor.

To give a general description of the sequence of processing from image input to print output, image data to be printed (original image data) is input from an external source via a communications interface 170, and is accumulated in the image memory 174. At this stage, multiple-value RGB image data is stored in the image memory 174, for example.

In this inkjet recording device 110, an image which appears to have a continuous tonal graduation to the human eye is formed by changing the droplet ejection density and the dot size of fine dots created by ink (coloring material), and therefore, it is necessary to convert the input digital image into a dot pattern which reproduces the tonal graduations of the image (namely, the light and shade toning of the image) as faithfully as possible. Therefore, original image data (RGB data) stored in the image memory 174 is sent to the print controller 180, via the system controller 172, and is converted to the dot data for each ink color by a half-toning technique, using dithering, error diffusion, or the like, by passing through the density data generation unit 180A, the correction processing unit 180B, and the ink ejection data generation unit 180C of the print controller 180.

In other words, the print controller 180 performs processing for converting the input RGB image data into dot data for the four colors of C, M, Y and K. The dot data generated by the print controller 180 in this way is stored in the image buffer memory 182. This dot data of the respective colors is converted into CMYK droplet ejection data for ejecting ink from the nozzles 151 of the head 150, thereby establishing the ink ejection data to be printed.

The head driver 184 outputs a drive signal for driving the actuators 158 corresponding to the nozzles 151 of the head 150 in accordance with the print contents, on the basis of the ink ejection data and the drive waveform signals supplied by the print controller 180. A feedback control system for maintaining constant drive conditions in the head may be included in the head driver 184.

By supplying the drive signal output by the head driver 184 to the head 150 in this way, ink is ejected from the corresponding nozzles 151. By controlling ink ejection from the printing head 150 in synchronization with the conveyance speed of the recording paper 116, an image is formed on the recording paper 116.

As described above, the ejection volume and the ejection timing of the ink droplets from the respective nozzles are controlled via the head driver 184, on the basis of the ink ejection data generated by implementing prescribed signal processing in the print controller 180, and the drive signal waveform. By this means, prescribed dot size and dot positions can be achieved.

The density conversion processing unit 180A1, the position error non-uniformity correction processing unit 180B1, the density non-uniformity correction processing unit 180B2 and the halftone processing unit 180C1 are composed in such a manner that their respective processing can be selected or deselected, and the print controller 180 is able to omit any processing in accordance with the type of input image data.

Figure 7:
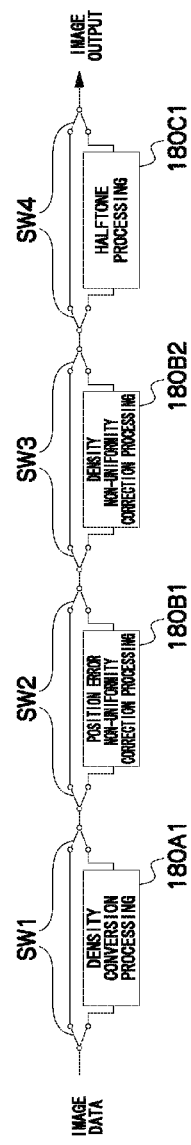
FIG. 7 is a diagram for describing the selection or deselection of processing in the respective processing units.

More specifically, as illustrated in FIG. 7, a switch SW1 is provided in the density conversion processing unit 180A1, a switch SW2 is provided in the position error non-uniformity correction processing unit 180B1, a switch SW3 is provided in the density non-uniformity correction processing unit 180B2, and a switch SW4 is provided in the halftone processing unit 180C1, and by controlling these respective switches, it is possible to select or deselect the processing by the respective processing units, in respect of the input image data.

For example, the switch SW1 makes it possible to switch between inputting the input image data to the density conversion processing unit 180A1 to carry out density conversion processing, or not inputting the image data to the density conversion processing unit 180A1 not to carry out density conversion processing. The print control unit 180 judges whether or not the density conversion processing is necessary in respect of the input image data, and controls the switch SW1 accordingly.

The same applies to the other processing units, namely, the position error non-uniformity correction processing unit 180B1, the density non-uniformity correction processing unit 180B2 and the halftone processing unit 180C1, and it is possible to select between inputting data to the respective processing units to process the data, or not inputting the data not to process the data, by means of the switches SW2 to SW4.

Returning to FIG. 6, as described in relation to FIG. 1, the print determination unit 124 is a block including an image sensor, which reads in the image printed onto the recording medium 116, performs various required signal processing operations, and the like, and determines the print situation (presence/absence of ejection, variation in droplet ejection, optical density, and the like), these determination results being supplied to the print controller 180 and the system controller 172.

The print controller 180 implements various corrections with respect to the head 150, on the basis of the information obtained from the print determination unit 124, according to requirements, and it implements control for carrying out cleaning operations (nozzle restoring operations), such as preliminary ejection, suctioning, or wiping, as and when necessary.

It is also possible to adopt a mode in which all or a portion of the functions carried out by the density data generation unit 180A, the correction processing unit 180B and the ink ejection data generation unit 180C illustrated in FIG. 6 are installed in the host computer 186 side.

Figure 8:
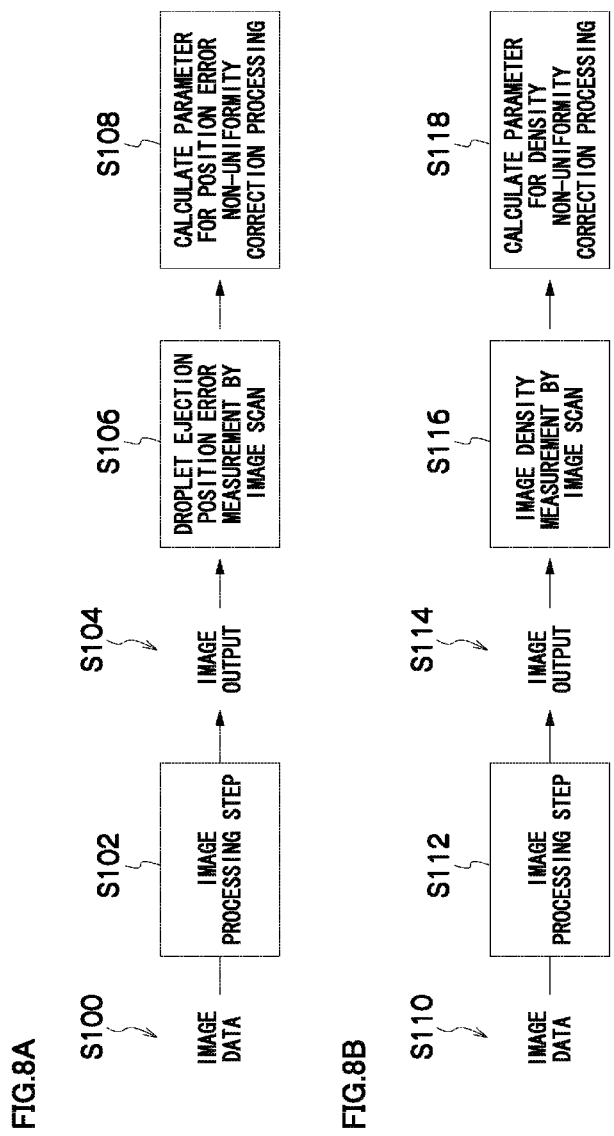
FIGS. 8A and 8B are diagrams illustrating a process of calculating parameters for non-uniformity correction processing.

Calculation of Parameters for Position Error Non-Uniformity Correction Processing Next, the process of calculating parameters for position error non-uniformity correction processing in the inkjet recording apparatus 110 will be described with reference to FIG. 8A.

Firstly, the image data of a test chart for position error measurement stored in the ROM 175 is input to the print controller 180 via the system controller 172 (step S100). The print controller 180 carries out image processing in respect of this image data (step S102).

Figure 9:
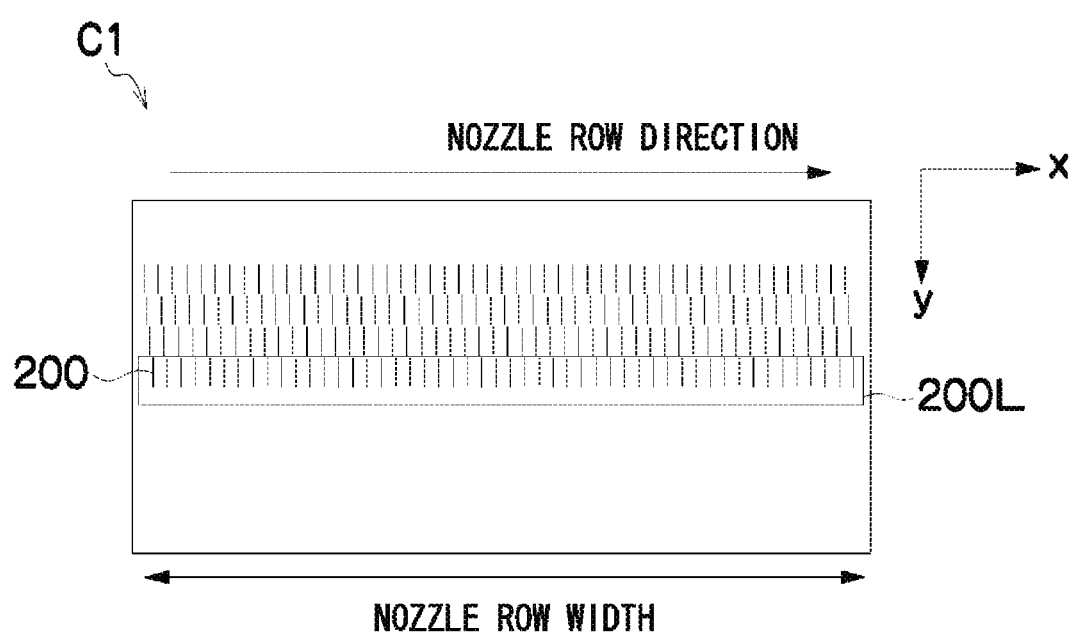
FIG. 9 is a plan diagram illustrating an example of a test chart for position error measurement.

FIG. 9 is a plan diagram illustrating an example of a test chart for position error measurement. As illustrated in FIG. 9, the test chart for position error measurement C1 is formed by printing, at prescribed intervals in the X direction, line-shaped patterns 200 which are substantially parallel to the Y direction, by using the recording head 112. When creating a test chart for position error measurement C1, more specifically, a pattern 200L corresponding to one line is printed by ejecting liquid every other n nozzles in the X direction. Thereupon, the nozzles which eject liquid are shifted by one nozzle in the X direction and printing is carried out from every other n nozzles. By repeating this n times, a pattern 200 is printed by ejecting liquid from all of the nozzles.

The droplet ejection position error of the respective nozzles 151 is measured by reading in the respective lines of this pattern 200, and therefore the pattern 200 is desirably formed by droplets of a uniform droplet size. However, if half-tone processing is carried out, there is a possibility that the respective lines of the pattern 200 will be printed with an ejected droplet size that is not intended in relation to the input data. Consequently, when outputting a test chart for position error measurement C1, halftone processing is not carried out. Here, the data of the test chart for position error measurement C1 is data in which halftoning is not carried out and the droplet ejection size is uniform.

Furthermore, since the test chart is aimed at calculating new parameters for position error non-uniformity correction processing, the test chart should be output without applying position error non-uniformity correction processing, so as not to reflect the results of the position error non-uniformity correction processing based on the current parameters. Since the droplet ejection position error is the object of measurement, there is no need to carry out density conversion processing and density non-uniformity correction processing.

In this way, density conversion processing, position error non-uniformity correction processing, density non-uniformity correction processing, and half-tone processing are not carried out in respect of the data of the test chart for position error measurement C1.

Figure 10:
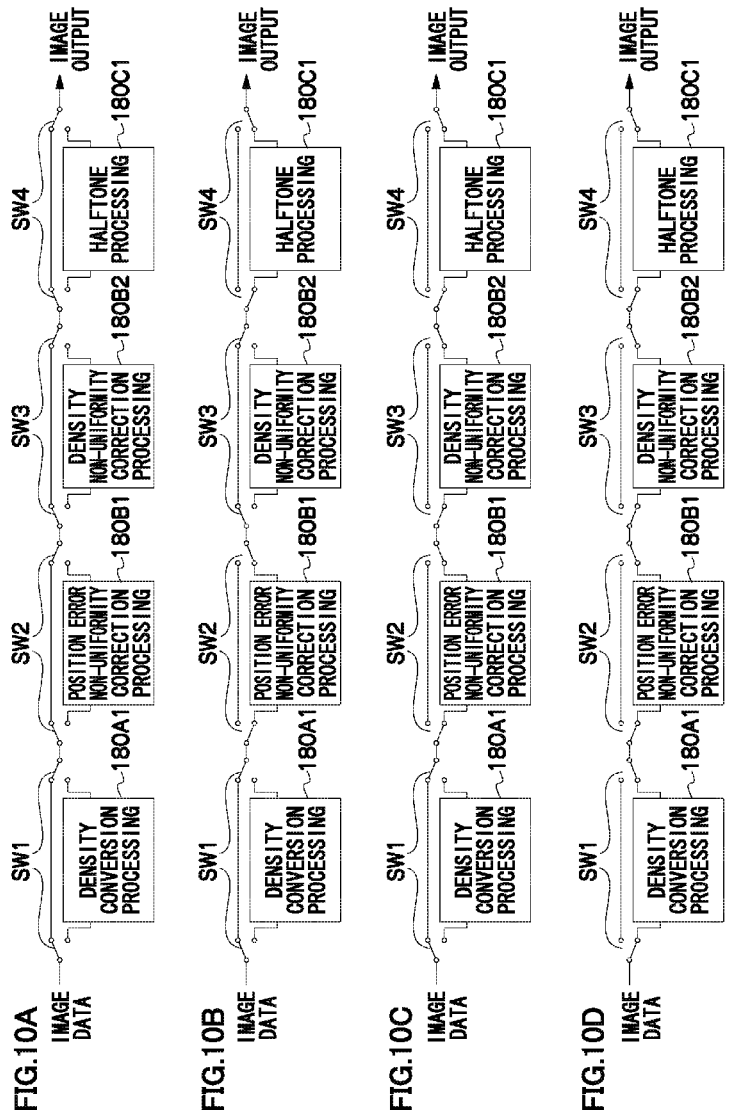
FIGS. 10A to 10D are diagrams illustrating whether or not processing is carried out in each processing unit, for respective input data.

Consequently, the print controller 180 controls the switches SW1 to SW4 as illustrated in FIG. 10A, in such a manner that the data of the test chart for position error measurement C1 input from the ROM 175 is not input to the density conversion processing unit 180A1, the position error non-uniformity correction processing unit 180B1, the density non-uniformity correction processing unit 180B2 or the half-tone processing unit 180C1. More specifically, the input image data is output directly, without carrying out processing by means of these processing units.

The test chart for position error measurement C1 which has undergone image processing in this way is output to a medium (step S104), and the image of a test chart for position error measurement on the medium is read in by the print determination unit 124. The system controller 172 performs measurement of the droplet ejection position error and acquires position error data, on the basis of this read data (step S106).

Moreover, parameters for position error non-uniformity correction processing are calculated from this position error data (step S108). For this calculation processing method, it is desirable to use a method described in Japanese Patent Application Publication No. 2006-347164. More specifically, in order to minimize the visibility of density non-uniformities, the parameters for position error non-uniformity correction processing for each of the nozzles are specified on the basis of conditions which minimize the low-frequency components of the power spectrum of the density non-uniformity.

The parameters for position error non-uniformity correction processing which have been calculated in this way are stored in the position error non-uniformity correction parameter storage unit 192.

Calculation of Parameters for Density Non-Uniformity Correction Processing

Next, the process of calculating parameters for density non-uniformity correction processing in the inkjet recording apparatus 110 will be described with reference to FIG. 8B.

Firstly, the image data of a test chart for density measurement stored in the ROM 175 is input to the print controller 180 via the system controller 172 (step S110). The print controller 180 carries out image processing in respect of this image data (step S112).

Figure 11:
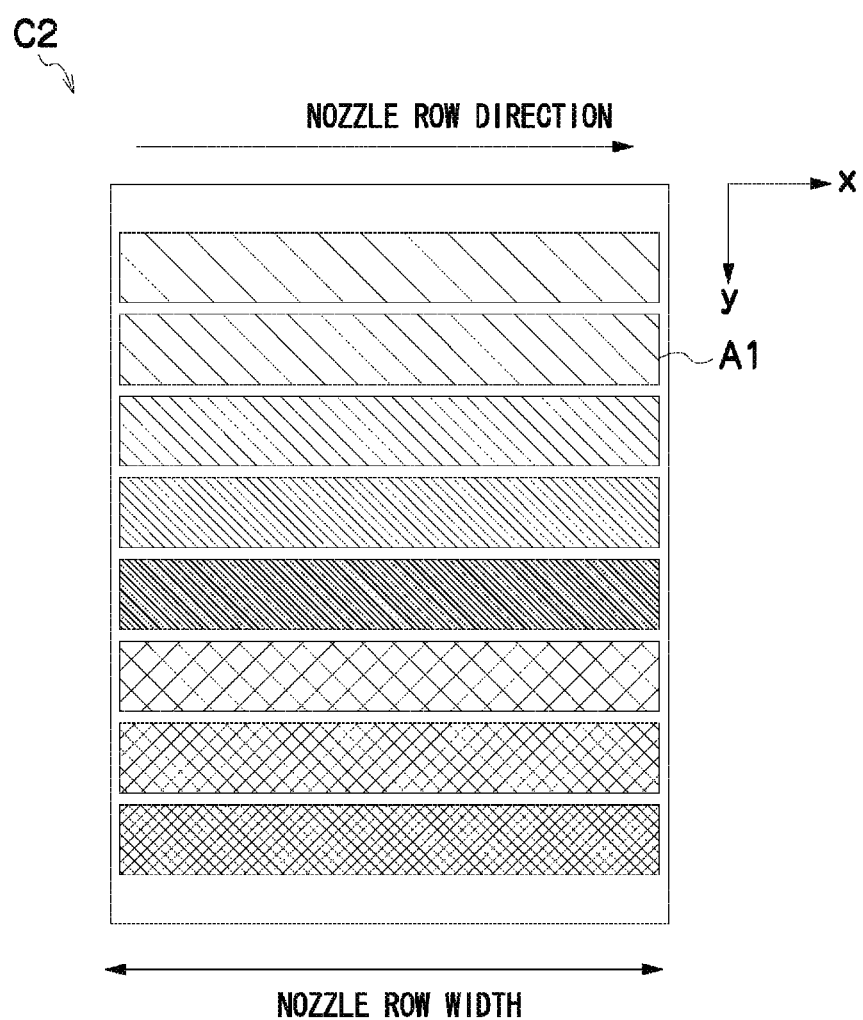
FIG. 11 is a plan diagram illustrating an example of a test chart for density measurement.

FIG. 11 is a plan diagram illustrating an example of a test chart for density measurement. As illustrated in FIG. 11, the test chart for density measurement C2 is created by printing density patches of a plurality of levels (in FIG. 11, 8 levels) in the Y direction, while maintaining uniform density in the X direction.

Since the output density corresponding to the respective nozzles 151 is measured by reading in the density patches A1, then the density patches A1 should be subjected to position error non-uniformity correction processing and halftone processing.

Furthermore, since the test chart is aimed at calculating new parameters for density non-uniformity correction processing, the test chart should be output without applying density non-uniformity correction processing and density conversion processing, so as not to reflect the results of density non-uniformity correction processing and density conversion processing based on the current parameters.

In this way, density conversion processing and density non-uniformity correction processing are not carried out, but position error non-uniformity correction processing and halftone processing are carried out in respect of the data of the test chart for density measurement C2.

Consequently, the print controller 180 controls the switches SW1 to SW4 as illustrated in FIG. 10B, in such a manner that the data of the test chart for density measurement C2 input from the ROM 175 is not input to the density conversion processing unit 180A1 and the density non-uniformity correction processing unit 180B2, but is input to the position error non-uniformity correction processing unit 180B1 and the halftone processing unit 180C1. More specifically, the image data is output after carrying out the processing in the position error non-uniformity correction processing unit 180B1 and the halftone processing unit 180C1 only.

The test chart for density measurement C2 which has undergone image processing in this way is output to a medium (step S114), and the image of a test chart for density measurement on the medium is read in by the print determination unit 124. The system controller 172 measures the density of each of the nozzles 115 of the head 150, on the basis of the read data, and thereby acquires nozzle row direction density data (S116).

Figure 12:
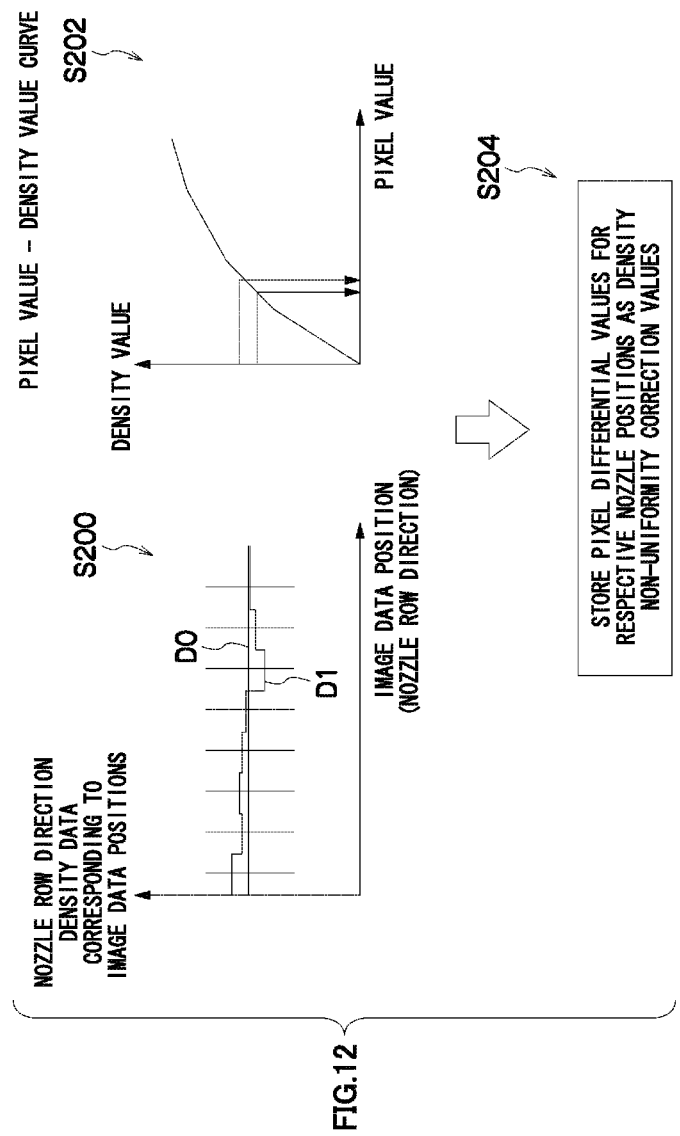
FIG. 12 is a diagram for describing the calculation of density correction values based on density measurement values.

The parameters for density non-uniformity correction processing are calculated from the nozzle row direction density data measured in this way (step S118). The process of calculating the parameters for density non-uniformity correction processing involves calculating the difference between the nozzle row direction density data D1 in terms of positions in the nozzle row direction in the read image data and a previously calculated target density value D0, as illustrated in FIG. 12 (step S200).

Next, the differential in the density value for each position in the nozzle row direction in the read image data calculated at step S200 is converted to a differential in the pixel value of the input image data, in accordance with a pixel value-density value curve which indicates the correspondence between the pixel value and the output density value of the input image data, this curve having been prepared in advance by experimentation (step S202). This differential in the pixel value of the input image data is stored in the density non-uniformity correction parameter storage unit 190 as a density non-uniformity correction value for each nozzle position (step S204).

As described above, the test chart for position error measurement C1 and the test chart for density measurement C2 are output by changing the image processing steps.

Overall Operation for Changing Image Processing Steps

Figure 13:
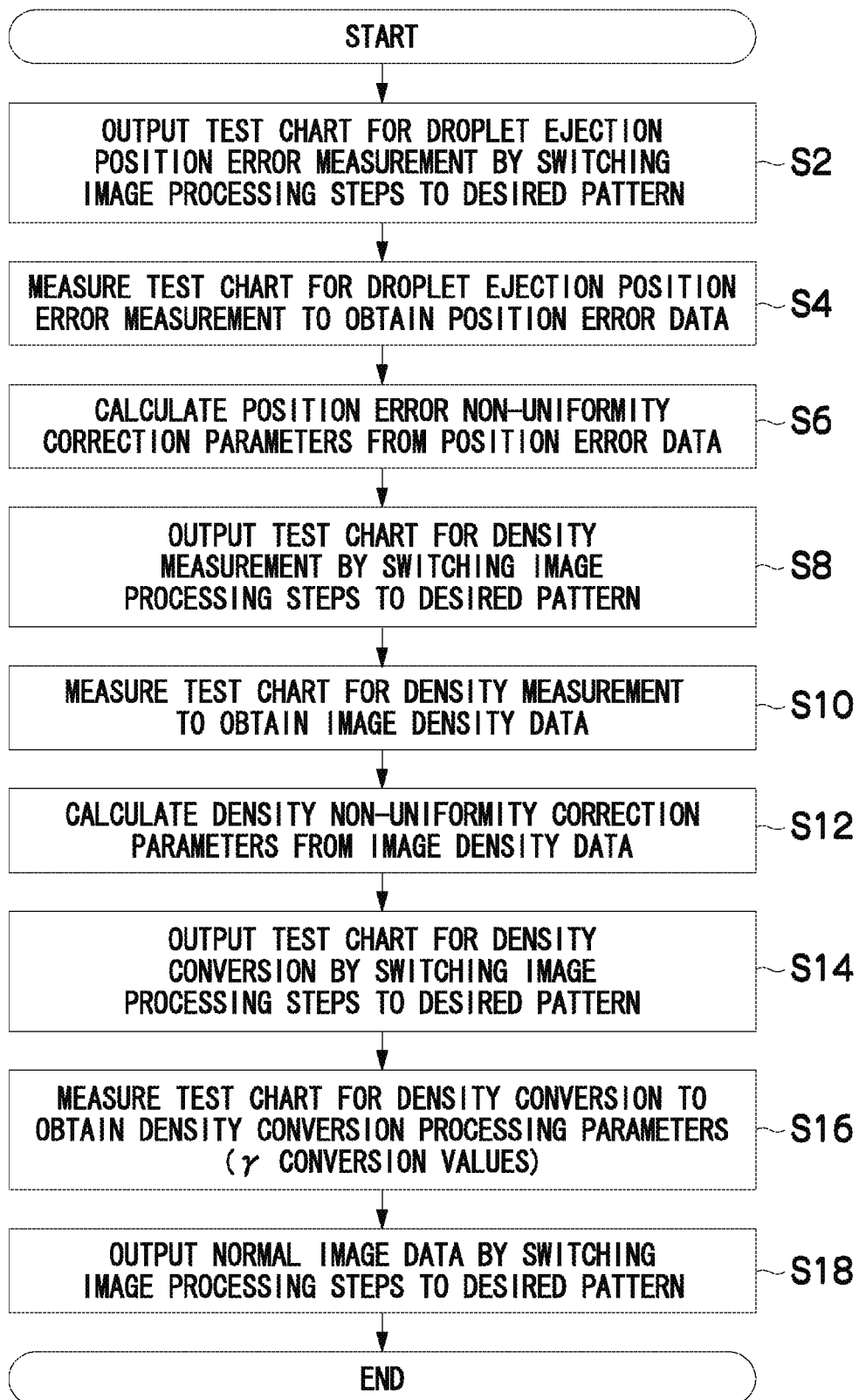
FIG. 13 is a flowchart showing the operation of an inkjet recording apparatus.

The image processing in the inkjet recording apparatus 110 composed as described above will now be explained with reference to FIG. 13.

Firstly, the image processing steps are switched to a desired pattern and the test chart for position error measurement C1 is output (step S2). The test chart for position error measurement C1 output in this way is read in by the print determination unit 124 to acquire position error data (step S4). Moreover, parameters for position error non-uniformity correction are calculated from this position error data (step S6).

These processes are similar to the processes described with reference to FIG. 8A above. The image processing steps for a desired pattern in step S2 are steps in which processing is not carried out by the density conversion processing unit 180A1, the position error non-uniformity correction processing unit 180B1, the density non-uniformity correction processing unit 180B2 or the halftone processing unit 180C1, as illustrated in FIG. 10A.

Thereupon, the image processing steps are switched to a desired pattern to output the test chart for density measurement C2 (step S8). The test chart for density measurement C2 output in this way is read in by the print determination unit 124 and nozzle row direction density data is acquired (step S10). Moreover, density non-uniformity correction parameters are calculated from this nozzle row direction density data (step S12).

These processes are similar to the process described with reference to FIG. 8B above. The image processing step of a desired pattern in step S8 is a step in which processing is not carried out by the density conversion processing unit 180A1 and the density non-uniformity correction processing unit 180B2, and processing is carried out by the position error non-uniformity correction processing unit 180B1 and the halftone processing unit 180C1, as illustrated in FIG. 10B.

Moreover, the image processing step is switched to a desired pattern to output the test chart for density conversion (step S14). The test chart for density conversion output in this way is read in by the print determination unit 124 and density conversion processing parameters are calculated (step S16).

Figure 16:
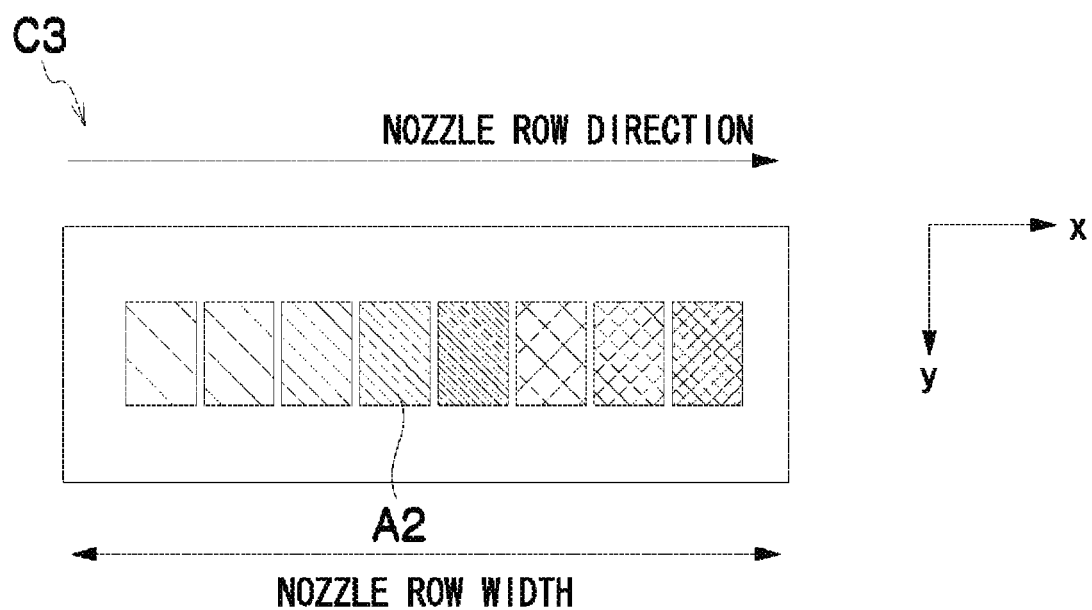
FIG. 16 is a plan diagram illustrating an example of a test chart for density conversion.

FIG. 16 is a plan diagram illustrating an example of a test chart for density conversion. As illustrated in FIG. 16, the test chart for density conversion C3 is a test chart formed by printing a plurality of (in FIG. 16, eight) density patches A2 arranged in the X direction.

The test chart for density conversion C3 serves to measure the relationship between the input value (image data value) and the output density (reflective density of test chart, and the like), and therefore the correspondence with the nozzle positions does not have to be taken into account. Consequently, this test chart does not need to have a width which covers the whole nozzle width.

The respective density patches A2 are printed after being subjected to the application of non-uniformity correction in accordance with the prescribed input density, the density patches A2 are read in by the print determination unit 124, and the output density is measured. Density conversion processing parameters (gamma conversion values) for correcting tonal non-linearity are generated on the basis of the relationship between the input density and the output density.

In this way, the test chart for density conversion C3 should be output after applying the position error non-uniformity correction processing, density non-uniformity correction processing and halftone processing. Furthermore, since the test chart is aimed at calculating new density conversion processing parameters (gamma conversion values), the test chart should be output without applying density conversion processing, so as not to reflect the results of the density conversion processing based on the current parameters.

Consequently, the image processing step of a desired pattern in step S14 is a step in which processing is not carried out by the density conversion processing unit 180A1, but processing is carried out by the position error non-uniformity correction processing unit 180B1, the density non-uniformity correction processing unit 180B2 and the halftone processing unit 180C1, as illustrated in FIG. 10C.

Finally, the image processing step is switched to processing for printing a desired pattern and normal image data is output (step S18).

The normal image data is subjected to density conversion processing, position error non-uniformity correction processing, density non-uniformity correction processing and halftone processing. Consequently, the image processing step of a desired pattern here is a step in which processing is carried out by all of the density conversion processing unit 180A1, the position error non-uniformity correction processing unit 180B1, the density non-uniformity correction processing unit 180B2 and the halftone processing unit 180C1, as illustrated in FIG. 10D.

In this way, by making it possible to select the image processing steps in accordance with the type of image data input, it is possible to carry out image processing which is suited to the image data, without impairing the information contained in the image data. In particular, if the input image data is test chart data for calculating correction values for a prescribed non-uniformity correction processing device, the test chart data is not input to the prescribed non-uniformity correction processing device so as not to reflect the results of the processing of the prescribed non-uniformity correction processing device in the output data, and consequently a suitable test chart can be output and therefore it is possible to calculate suitable correction values for the prescribed non-uniformity correction processing device.

Second Embodiment

Next, a second embodiment of the present invention is described. In the following description, parts of the composition which are similar to the first embodiment described above are omitted from the explanation below.

In the first embodiment, the respective non-uniformity correction processes can be selected or deselected, but in the second embodiment, it is possible to select whether or not the result of processing is reflected in the output data, by selecting the respective parameters for non-uniformity correction processing.

Figure 14:
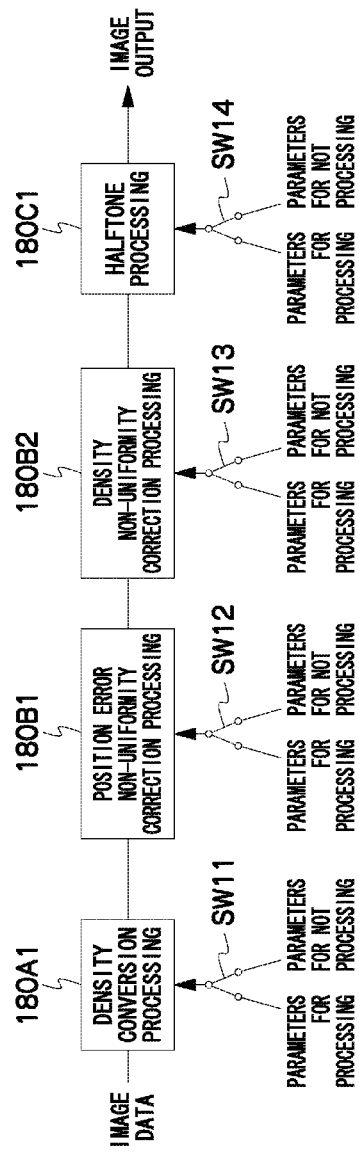
FIG. 14 is a diagram for describing the selection of parameters for processing in the respective processing units.

More specifically, as illustrated in FIG. 14, a switch SW11 is provided in the density conversion processing unit 180A1, a switch SW12 is provided in the position error non-uniformity correction processing unit 180B1, a switch SW13 is provided in the density non-uniformity correction processing unit 180B2, and a switch SW14 is provided in the halftone processing unit 180C1, and by controlling these respective switches, it is possible to select or deselect the processing parameters by the respective processing units.

For example, the switch SW11 is a switch capable of selecting whether to carry out density conversion processing using parameters for processing or whether to carry out density conversion processing using parameters for not processing, in respect of the data input to the density conversion processing unit 180A1. Here, the parameters for processing are parameters in which the desired processing results are reflected in the input data, and the parameters for not processing are parameters which have been processed so as to output the values of the input data directly, without alteration. Consequently, the data which has been processed by selecting the parameters for not processing is the same as data which passes without being input to the processing unit. The print control unit 180 judges whether or not the density conversion processing is necessary in respect of the input image data, and controls the switch SW11 accordingly.

Apart from this, the same also applies to the position error non-uniformity correction processing unit 180B1, the density non-uniformity correction unit 180B2 and the halftone processing unit 180C1, and the processed parameters which have been subjected to normal processing and the unprocessed parameters which are processed in such a manner that the values of the input data are output directly without alternation, can be selected respectively by means of the switches SW12 to SW14.

Next, the control of the switches SW11 to SW14 with respect to the input data in the second embodiment will be described.

As described in the first embodiment, if the input image data is a test chart for position error measurement, then density conversion processing, position error non-uniformity correction processing, density non-uniformity correction processing and halftone processing are not carried out. Consequently, in the present embodiment, the print controller 180 controls the switches SW11 to SW14 as illustrated in FIG. 15A, and processing is carried out using the parameters for not processing in the density conversion processing unit 180A1, the position error non-uniformity correction processing unit 180B1, the density non-uniformity correction processing unit 180B2 and the halftone processing unit 180C1.

Furthermore, if the input image data is a test chart for density measurement, then the density conversion processing and the density non-uniformity correction processing are not carried out, and the position error non-uniformity correction processing and halftone processing are carried out. Consequently, the print controller 180 controls the switches SW11 to SW14 as illustrated in FIG. 15B, so that processing is carried out using the parameters for not processing in the density conversion processing unit 180A1 and the density non-uniformity correction processing unit 180B2, and processing is carried out using the parameters for processing in the position error non-uniformity correction processing unit 180B1 and the halftone processing unit 180C1.

Similarly, if the input image data is a test chart for density conversion, as illustrated in FIG. 15C, processing is carried out using the parameters for not processing in the density conversion processing unit 180A1, and processing is carried out using the parameters for processing in the position error non-uniformity correction processing unit 180B1, the density non-uniformity correction processing unit 180B2 and the halftone processing unit 180C1.

Moreover if the input image data is normal image data, then as illustrated in FIG. 15D, processing is carried out using the parameters for processing in the density conversion processing unit 180A1, the position error non-uniformity correction processing unit 180B1, the density non-uniformity correction processing unit 180B2 and the halftone processing unit 180C1.

In this way, by making it possible to select the parameters of the respective image processing devices in accordance with the type of image data input, it is possible to carry out image processing which is suited to the image data, without impairing the information contained in the image data. In particular, if the input image data is test chart data for calculating correction values for a prescribed non-uniformity correction processing device, the data is processed using parameters for not processing in that prescribed non-uniformity correction processing device, so as not to reflect the results of the processing of the prescribed non-uniformity correction processing device in the output data, and consequently a suitable test chart can be output and therefore it is possible to calculate suitable correction values for the prescribed non-uniformity correction processing device.

In the embodiment described above, position error non-uniformity correction and density non-uniformity correction are described as examples of non-uniformity correction, but the invention can also be applied to modes which include other non-uniformity correction processing devices.

For example, there may be a case where ejection failure nozzles are determined using a test chart for ejection failure determination to carry out ejection failure non-uniformity correction. The test chart for ejection failure determination may have a similar composition to the test chart for position error measurement C1 illustrated in FIG. 9. In image processing for outputting this test chart for ejection failure determination, the results of ejection failure non-uniformity correction processing are not reflected in the output data. In other words, either ejection failure non-uniformity correction is not carried out as in the first embodiment, or ejection failure non-uniformity correction is carried out using parameters for not processing as in the second embodiment.

In the embodiments described above, a print determination unit (scanner) 124 is provided in the inkjet recording apparatus 110, but it is also possible to provide a print determination unit for reading a test chart for density measurement, separately from the inkjet recording apparatus 110.

Furthermore, the embodiments described above use an example where a full line type of head is employed, but the present invention can also be applied to an inkjet recording apparatus which uses a shuttle type head.

Moreover, in the embodiments described above, the present invention is applied to an inkjet recording apparatus, but the scope of application of the present invention is not limited to this. More specifically, the present invention can also be applied to image recording apparatuses using formats other than an inkjet recording apparatus, for example, a thermal transfer recording apparatus comprising a recording head which uses thermal elements as recording elements, an LED electrophotographic printer comprising a recording head which uses LED elements are recording elements, and a silver (halide) photographic printer which has an LED line exposure head.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image recording apparatus, comprising:
a recording head which has a plurality of recording elements;
a conveyance device which conveys at least one of the recording head and a recording medium to cause relative movement between the recording head and the recording medium;
an input device which inputs image data;
an image processing device which causes a plurality of subsidiary image processing devices to perform a plurality of subsidiary image processes with respect to the input image data so as to generate output data;
an image recording device which causes the recording head to perform recording on the recording medium according to the generated output data;
a selection device which selects a subsidiary image processing device from the plurality of subsidiary image processing devices; and
a control device which controls the selection device in accordance with the input image data, and
wherein the image processing device
does not reflect, in the output data, a processing result by the selected subsidiary image processing device, and reflects, in the output data, a processing result by the one or more subsidiary image processing devices which are different from the selected subsidiary image processing device.

2. The image recording apparatus as defined in claim 1, wherein the image processing device causes the subsidiary image processing device selected by the selection device, not to perform the subsidiary image process.

3. The image recording apparatus as defined in claim 1, wherein the image processing device causes the subsidiary image processing device selected by the selection device to perform the subsidiary image process using a parameter by which the processing result is not reflected in the output data.

4. The image recording apparatus as defined in claim 1, wherein the plurality of subsidiary image processing devices include a non-uniformity correction processing device which carries out correction processing of the image data according to information on various types of non-uniformity relating to the plurality of recording elements.

5. The image recording apparatus as defined in claim 4, wherein the non-uniformity correction processing device includes at least one of:
 a recording defect non-uniformity correction processing device which corrects a recording element having a recording defect, of the plurality of recording elements;
 a position error non-uniformity correction processing device which corrects recording position error of the plurality of recording elements; and
 a density non-uniformity correction processing device which corrects recording density of the plurality of recording elements.

6. The image recording apparatus as defined in claim 5, wherein:
 the non-uniformity correction processing device includes the recording defect non-uniformity correction processing device; and
 when the input image data is a test chart for recording-defect determination for determining the recording element having the recording defect of the plurality of recording elements, the selection device selects the recording defect non-uniformity correction processing device, and
 the image processing device
  does not reflect a processing result by the selected recording defect non-uniformity correction processing device in the output data corresponding to the input test chart for recording-defect determination, and
  reflects processing results by subsidiary image processing devices other than the selected recording defect non-uniformity correction processing device in the output data.

7. The image recording apparatus as defined in claim 6, further comprising a determination device which determines the recording element having the recording defect, of the plurality of recording elements, according to the test chart for recording-defect determination recorded by the image recording device,
 wherein the recording defect non-uniformity correction processing device carries out correction processing of the image data according to information on the determined recording element having the recording defect.

8. The image recording apparatus according to claim 5, wherein:
 the non-uniformity correction processing device includes the position error non-uniformity correction processing device; and when the input image data is a test chart for recording position error measurement for measuring the recording position error of the plurality of recording elements, the selection device selects the position error non-uniformity correction processing device, and
the image processing device
 does not reflect a processing result by the selected position error non-uniformity correction processing device in the output data, and
 reflects processing results by subsidiary image processing devices other than the selected position error non-uniformity correction processing device in the output data.

9. The image recording apparatus as defined in claim 8, further comprising a measurement device which determines the recording position error of the plurality of recording elements, according to the test chart for recording position error measurement recorded by the image recording device,
 wherein the position error non-uniformity correction processing device carries out correction processing of the image data according to information on the determined recording position error.

10. The image recording apparatus as defined in claim 5, wherein:
 the non-uniformity correction processing device includes the density non-uniformity correction processing device; and
 when the input image data is a test chart for density non-uniformity measurement for measuring the recording density of the plurality of recording elements, the selection device selects the density non-uniformity correction processing device, and
 the image processing device
  does not reflect a processing result by the selected density non-uniformity correction processing device in the output data, and
  reflects processing results by subsidiary image processing devices other than the selected density non-uniformity correction processing device in the output data.

11. The image recording apparatus as defined in claim 10, further comprising a density measurement device which determines the recording density of the plurality of recording elements, according to the test chart for density non-uniformity measurement recorded by the image recording device,
 wherein the density non-uniformity correction processing device carries out correction processing of the image data according to information on the determined recording density.

12. The image recording apparatus as defined in claim 1, wherein the plurality of recording elements are ink ejection nozzles.

13. An image processing apparatus comprising:
 an input device which inputs image data for performing recording onto a recording medium while at least one of a recording head having a plurality of recording elements and the recording medium is conveyed;
 an image processing device which causes a plurality of subsidiary image processing devices to perform a plurality of subsidiary image processes with respect to the input image data so as to generate output data;
 an output device which outputs the generated output data;
 a selection device which selects a subsidiary image processing device from the plurality of subsidiary image processing devices; and
 a control device which controls the selection device in accordance with the input image data, and wherein the image processing device
does not reflect, in the output data, a processing result by the selected subsidiary image processing device, and
reflects, in the output data, a processing result by the one or more subsidiary image processing devices which are different from the selected subsidiary image processing device.

14. An image processing method comprising:
an input step of inputting image data for performing recording onto a recording medium while conveying at least one of a recording head having a plurality of recording elements and the recording medium;
an image processing step of performing a plurality of subsidiary image processes with respect to the input image data so as to generate output data;
an output step of outputting the generated output data;
a selection step of selecting a subsidiary image process from the plurality of subsidiary image processes; and
a control step of controlling the selection step in accordance with the input image data, and
wherein the image processing step
does not reflect, in the output data, a processing result by the selected subsidiary image process, and
reflects, in the output data, a processing result by the one or more subsidiary image processes which are different from the selected subsidiary image process.

15. A non-transitory computer-readable medium storing instructions to cause a computer to execute at least an image processing method comprising:
an input step of inputting image data for performing recording onto a recording medium while conveying at least one of a recording head having a plurality of recording elements and the recording medium;
an image processing step of performing a plurality of subsidiary image processes with respect to the input image data so as to generate output data;
an output step of outputting the generated output data;
a selection step of selecting a subsidiary image process from the plurality of subsidiary image processes; and
a control step of controlling the selection step in accordance with the input image data, and
wherein the image processing step
does not reflect, in the output data, a processing result by the selected subsidiary image process, and
reflects, in the output data, a processing result by the one or more subsidiary image processes which are different from the selected subsidiary image process.

16. The image recording apparatus as defined in claim 1, wherein the control device controls the selection device to select the subsidiary image processing device depending on whether the input image data is data for a test chart or data for an output image other than a test chart, and when the input image data is the data for the test chart, the control device controls the selection device depending on content of processing performed by using the test chart.

* * * * *